April 29, 1958 C. W. HATCHER 2,832,506
DISPENSING MACHINE

Filed Jan. 14, 1953 7 Sheets-Sheet 1

INVENTOR
CREEL W. HATCHER
BY HIS ATTORNEYS
Howson & Howson

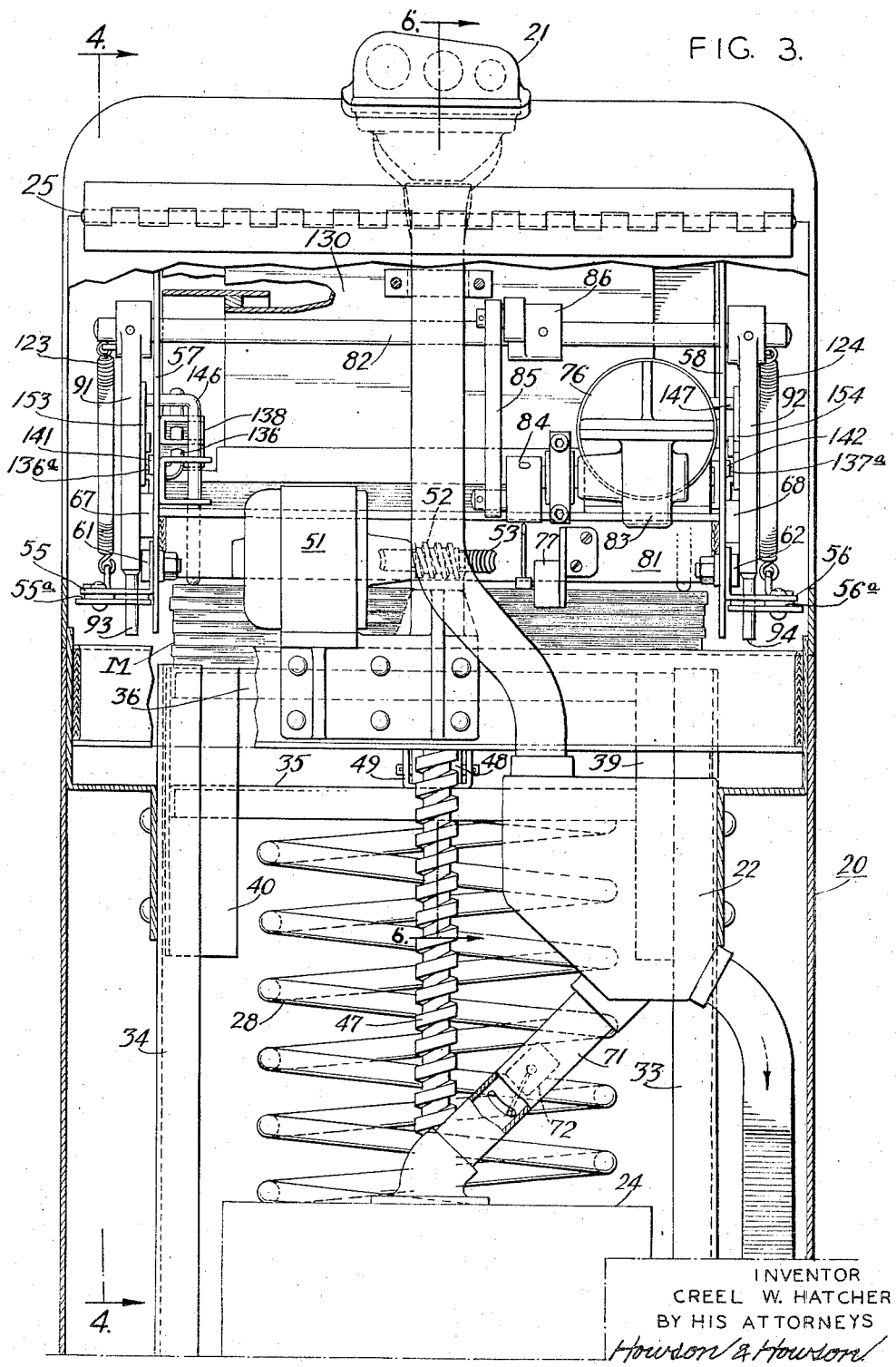

April 29, 1958     C. W. HATCHER     2,832,506
DISPENSING MACHINE
Filed Jan. 14, 1953           7 Sheets-Sheet 3
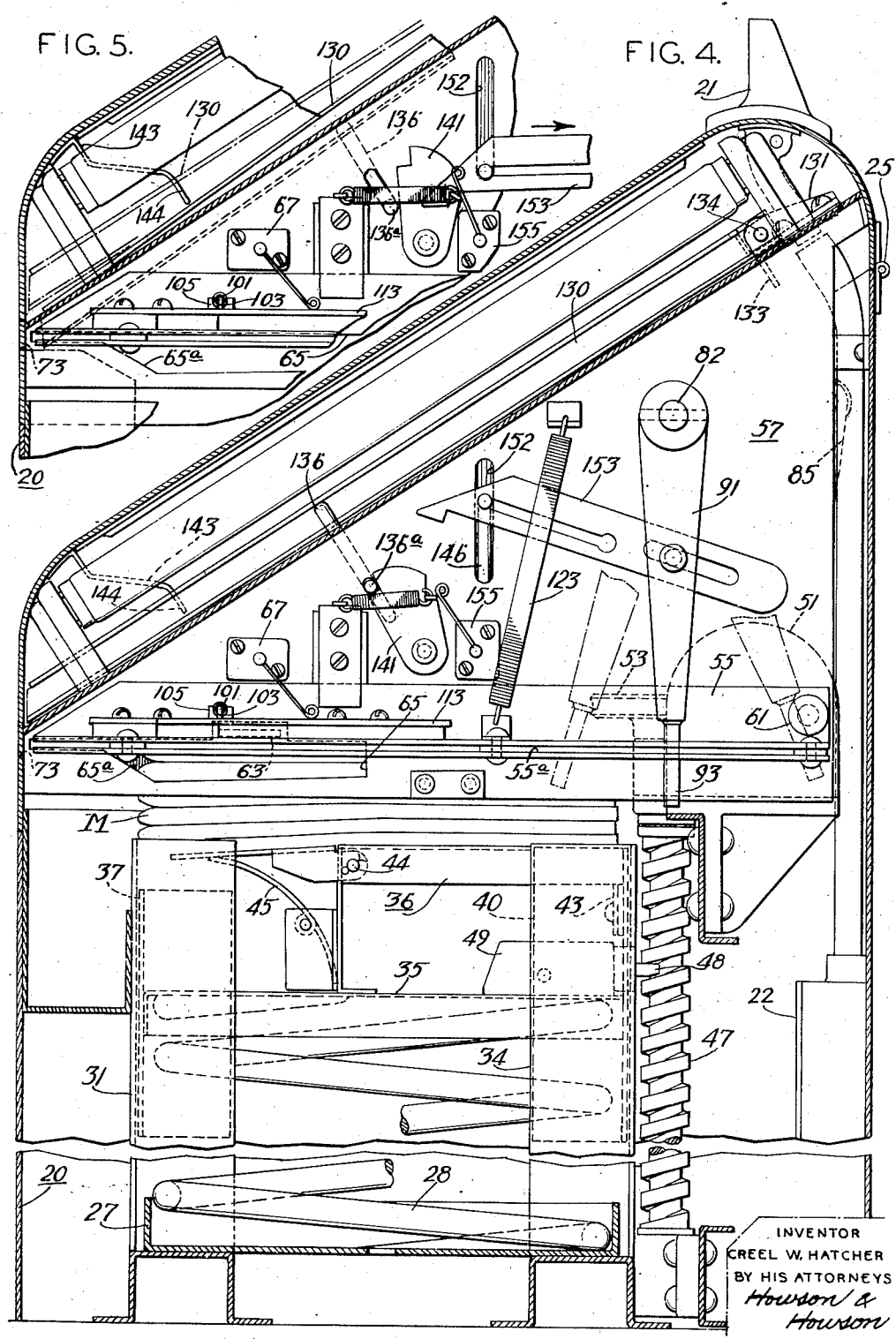
INVENTOR
CREEL W. HATCHER
BY HIS ATTORNEYS
Howson & Howson April 29, 1958 C. W. HATCHER 2,832,506
DISPENSING MACHINE
Filed Jan. 14, 1953 7 Sheets-Sheet 4
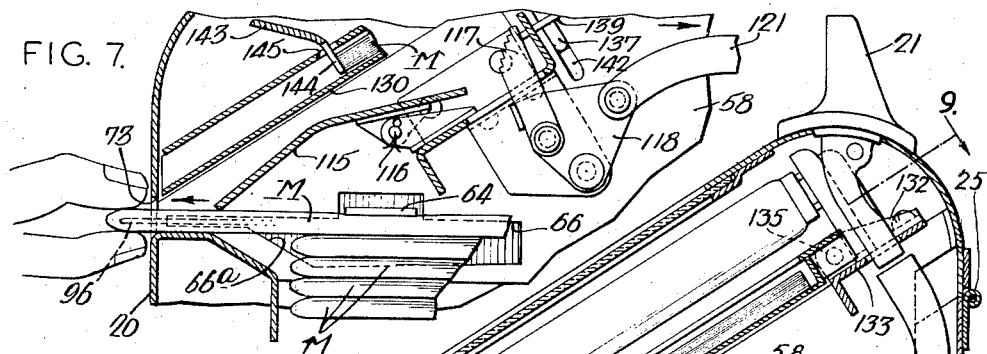
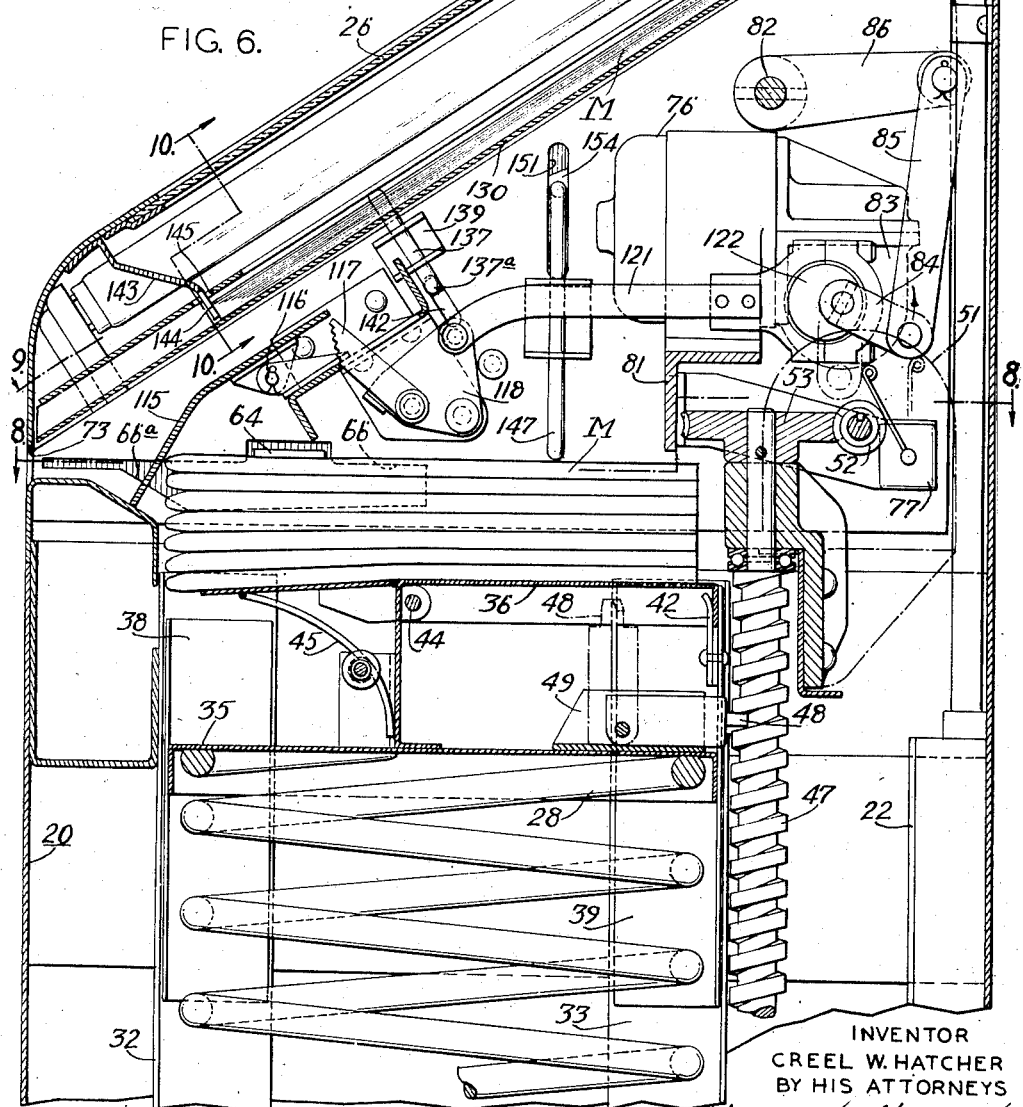
INVENTOR
CREEL W. HATCHER
BY HIS ATTORNEYS
Howson & Howson

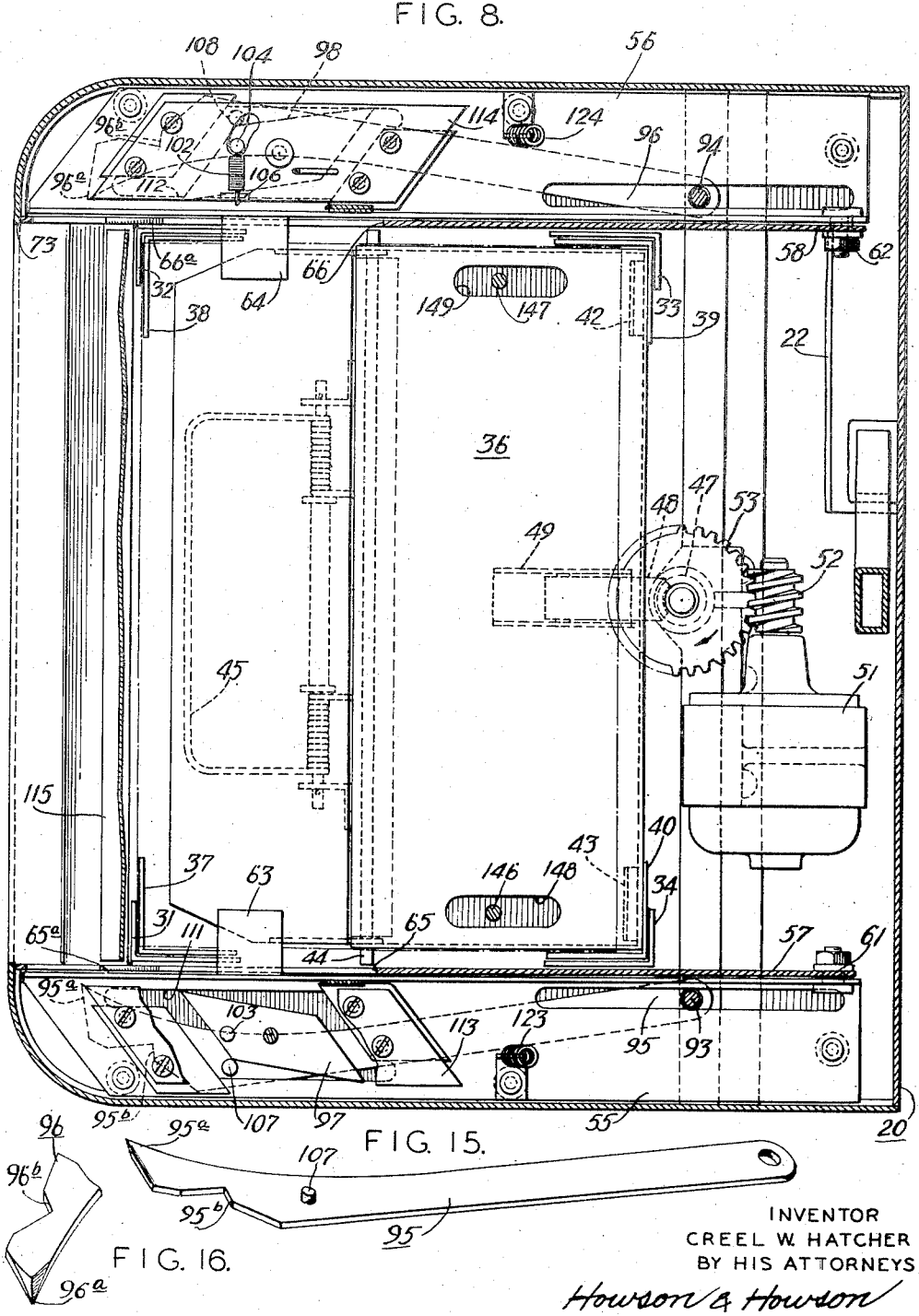

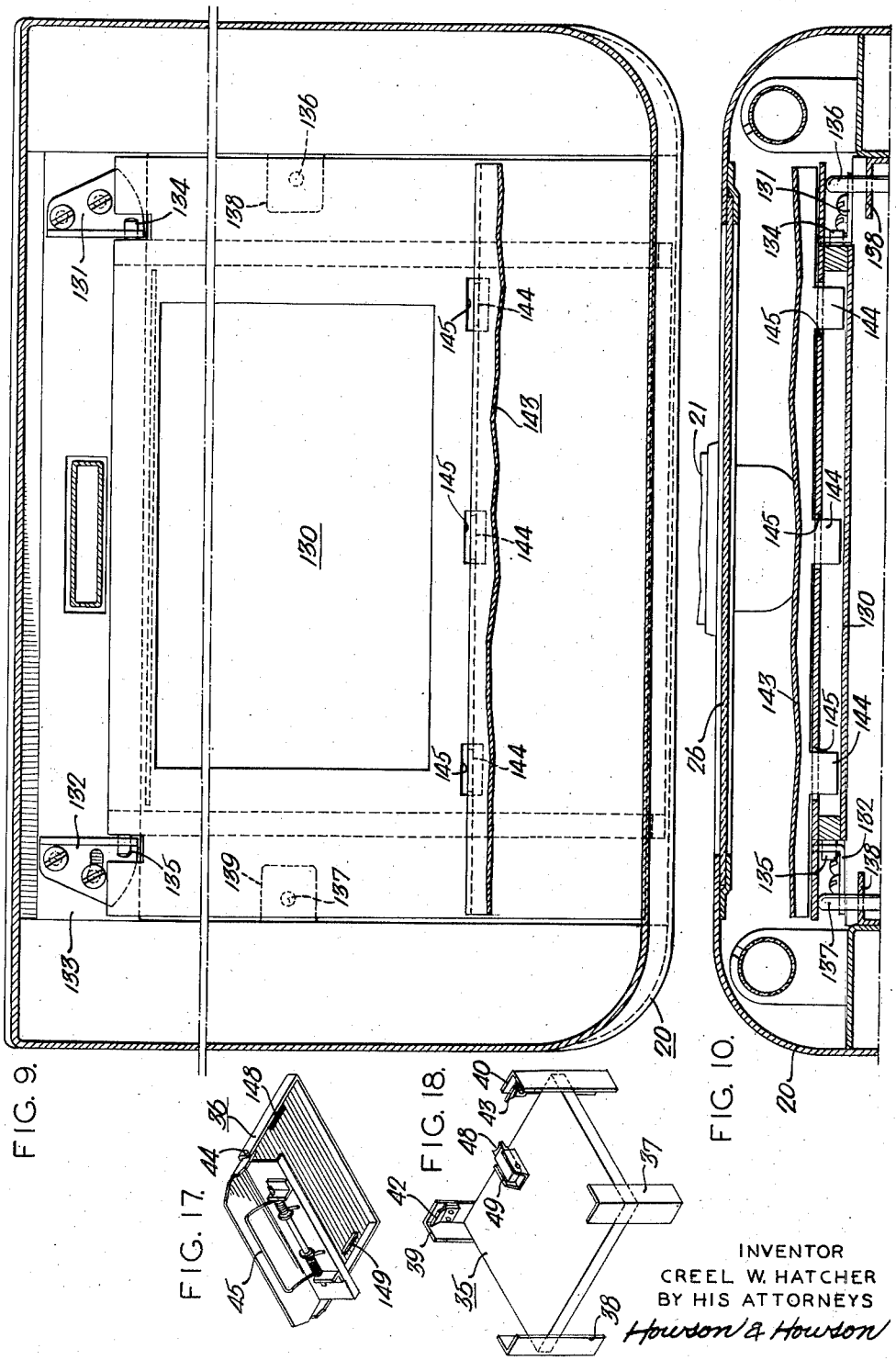

April 29, 1958     C. W. HATCHER     2,832,506
DISPENSING MACHINE
Filed Jan. 14, 1953     7 Sheets-Sheet 7
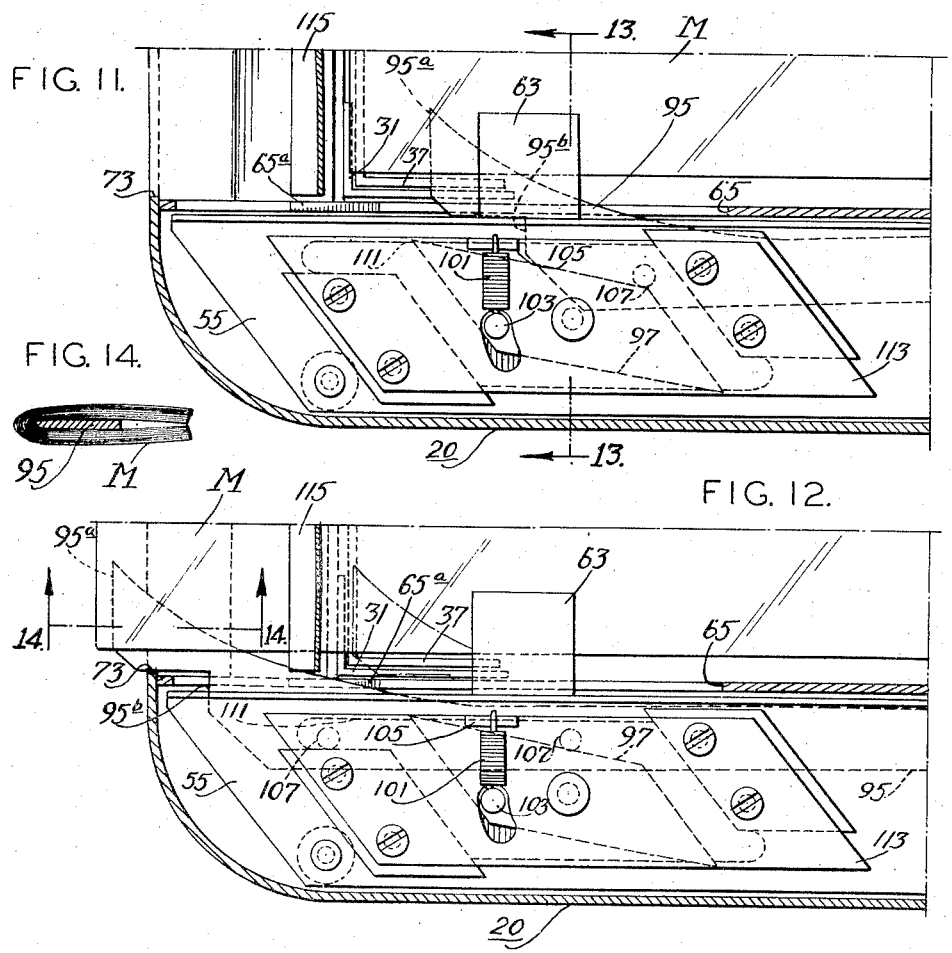
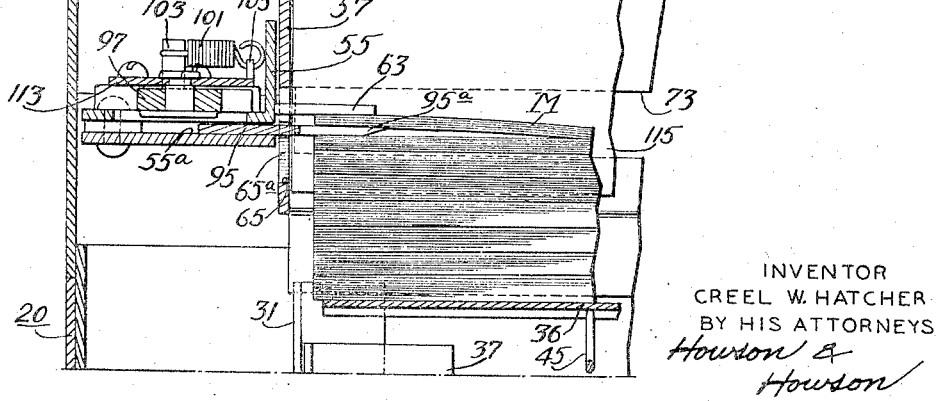
INVENTOR
CREEL W. HATCHER
BY HIS ATTORNEYS
Howson &
Howson

United States Patent Office 2,832,506
Patented Apr. 29, 1958

2,832,506

DISPENSING MACHINE

Creel W. Hatcher, Valley Forge, Pa.

Application January 14, 1953, Serial No. 331,236

16 Claims. (Cl. 221—103)

The present invention relates to new and useful improvements in dispensing or vending machines and more particularly to new and useful improvements in a dispensing or vending machine for magazines which supports a number of magazines and dispenses the magazines one at a time when change is inserted in the machine.

Prior to the present invention a dispensing machine has not been manufactured which may be used to dispense magazines. There has long been a need for a dispensing machine of this type to permit the sale of magazines in places which are not frequented enough to warrant a magazine stand and an attendant. For example, in small railroad stations and in subway and bus stations there is a ready market for various magazines, but there is not a sufficient market to warrant paying the salary of an attendant for a magazine stand. Accordingly, by placing an automatic magazine dispensing machine in a place of this type, a magazine company could greatly increase its sales with only a relatively small initial outlay for the machine.

With the foregoing in mind, the principal object of the present invention is to provide a novel magazine dispensing machine which is entirely automatic in operation and will support a number of magazines and dispense them one at a time when change is inserted into the machine.

Another object of the present invention is to provide a novel dispensing machine in which the last magazine to be dispensed from the machine is displayed in full view of the customer and after the machine is emptied a visual signal is given to prevent other customers from inserting change into the machine. The machine is also set so that it will return any money that might be inserted after it is empty.

Another object of the present invention is to provide a novel dispensing machine wherein a stack of magazines are supported on a moveable table and control mechanism is provided to maintain the top magazine on the stack in a predetermined position regardless of the number of magazines on the table so that the ejection blade which engages the magazines and forces them out of the dispensing machine will engage the magazines at exactly the same point regardless of the number of magazines in the machine.

A further object of the present invention is to provide a novel magazine dispensing machine of the above stated type which is foolproof in operation and has a means provided to prevent the removal of magazines from the machine without inserting change in the machine.

A still further object of the present invention is to provide a novel dispensing machine having the features and characteristics set forth which may be manufactured relatively easily and is entirely efficient and effective in operation and use.

These and other objects of the present invention and the various features and details of the operation and construction thereof are hereinafter more fully set forth and described with reference to the accompanying drawings, in which:

Fig. 3 is an enlarged rear elevational view partially in section of the dispensing machine shown in Figs. 1 and 2 illustrating the mechanism for elevating the magazines in the machine;

Fig. 4 is a sectional view taken on line 4—4, Fig. 3 illustrating the mechanism for controlling operation of the magazine-elevating mechanism;

Fig. 5 is a fragmentary sectional view of the feed end of the dispensing machine shown in Fig. 4 illustrating the machine in a position dispensing the last magazine therefrom;

Fig. 6 is a longitudinal sectional view taken on line 6—6, Fig. 3;

Fig. 7 is a fragmentary sectional view of the feed end of the machine shown in Fig. 6 in a position dispensing a magazine;

Fig. 8 is a transverse sectional view taken on line 8—8, Fig. 6 illustrating the mechanism for dispensing a magazine from the dispensing machine;

Fig. 9 is a transverse sectional view taken on line 9—9, Fig. 6 illustrating the means for supporting the magazine in the cover of the dispensing machine;

Fig. 10 is a fragmentary sectional view taken on line 10—10, Fig. 6;

Fig. 11 is an enlarged fragmentary sectional view of the dispensing mechanism illustrated in Fig. 8 in a position midway through a dispensing operation;

Fig. 12 is a fragmentary sectional view similar to Fig. 11 with the dispensing mechanism in its extreme forward position forcing a magazine out of the dispensing machine;

Fig. 13 is a fragmentary sectional view taken on line 13—13, Fig. 11;

Fig. 14 is a fragmentary sectional view taken on line 14—14, Fig. 12;

Fig. 15 is a perspective view of one of the ejection blades which force a magazine out of the dispensing machine;

Fig. 16 is a fragmentary perspective view of the forward end of the blade illustrated in Fig. 15;

Fig. 17 is a perspective view of the table which supports the magazines in the dispensing machine;

Fig. 18 is a perspective view of the supporting guide which carries the table illustrated in Fig. 17.

Figure 1:
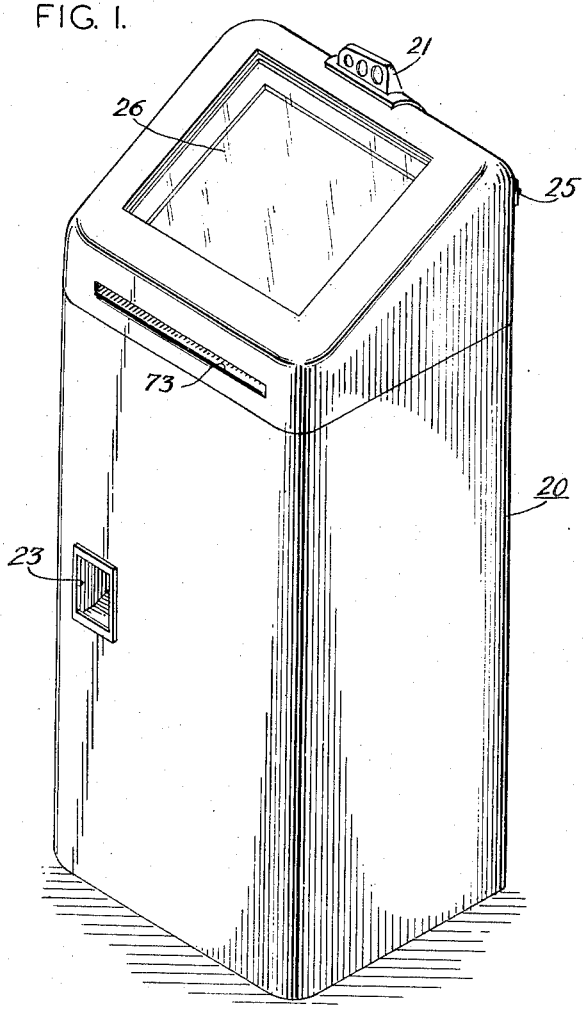
Fig. 1 is a perspective view of the dispensing machine of the present invention.
Figure 2:
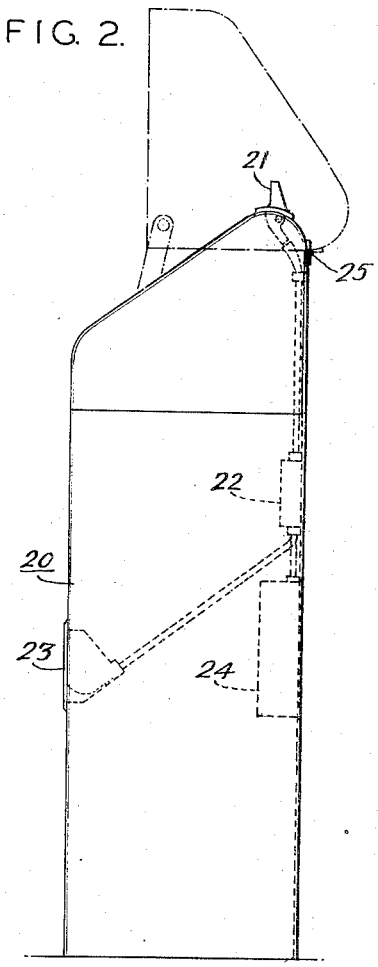
Fig. 2 is a side elevational view of the dispensing machine illustrating the placement of the coin changing apparatus.

Referring more specifically to the drawings and particularly to Figs. 1 and 2, a dispensing machine made in accordance with the present invention comprises a housing 20 which contains a stack of magazines M. A coin slot 21 is provided at the top of the machine which communicates with the standard type coin changer 22. The coin changer 22 receives the money placed in the coin slot 21, counts out the proper amount of change over and above the purcahse price of the magazine and returns the change to the user of the dispensing machine through a coin return opening 23. The remaining money is deposited in a coin box 24 and may be removed therefrom by the owner of the machine. The upper portion of the housing 20 is pivoted as indicated at 25 and may be elevated as shown in Fig. 2 to permit access to the interior of the machine. In addition a window 26 is provided in the upper face of the housing in which the current issue of the magazine being dispensed by the machine may be displayed.

With reference to Figs. 3, 4, 6, and 8 of the drawings, a generally circular plate 27 is mounted in the base of the housing 20 and supports a large coil spring 28. The coil spring 28 extends vertically in the housing 20 centrally of four corner posts or guide members 31, 32, 33, and 34 formed of angle iron or similar material as illustrated in Fig. 8 which define a general rectangular guide-way extending substantially the entire height of the housing 20. Positioned on top of the coil spring 28 and mounted for sliding vertical movement in the guide-way is a rectangular support member 35 which carries magazine table 36. The magazines M in turn rest on the table 36 with their bound ends extending toward the forward or discharge end of the dispensing machine.

As shown in Figs. 17 and 18, the support member 35 has four bearing members 37, 38, 39, and 40 at its corners which are engaged in the corner posts 31, 32, 33, and 34, respectively, in order to guide vertical movement of the support member 35. The table 36, in turn, engages brackets 42 and 43 on the guide members 39 and 40 and thereby is maintained in a horizontal position on the support member 35. The forward end of the table 36 is pivoted as indicated at 44 and is normally urged toward a horizontal position by means of a spring member 45. This is necessary since the bound end of the magazines is thicker than the remaining portion of the magazines and accordingly the forward end of the table is displaced downwardly from a horizontal plane as shown in Fig. 4, thereby maintaining the top magazine of the stack substantially horizontal. By this construction the entire weight of the stack of magazines is supported by the coil spring 28 and therefore it requires very little force to move the magazines vertically in the housing 20.

An important feature of the present invention is the provision of means for maintaining the magazines in the desired vertical position in the housing. This is accomplished by means of a rotatable feed screw 47 which extends vertically in the housing rearwardly of the support member 35 and engages a finger 48 pivotally mounted on a bracket 49 carried by the support member 35. As illustrated in Fig. 6, the finger 48 is movable between a vertical position extending upwardly from the support member 35 and a horizontal position wherein the finger 48 engages the feed screw 47. In normal operation of the machine the support member 35 is placed in the vertical guide-way in the housing on top of the coil spring 28 with the finger 49 in a horizontal position in engagement with the feed screw 47. The table 36 is then positioned on top of the support member 35 and the magazines M are placed on the table 36.

The magazines, table and support member are then forced downwardly in the housing by exerting pressure on the upper surface of the magazines. During the downward movement of the table 35 in the housing, the finger 48 ratchets over the feed screw 47 and when the pressure is removed from the magazines, the support member 35 is forced upwardly by means of the coil spring 28 and the finger 48 engages the feed screw 47 and prevents upward movement of the support member 35, table 36, and magazines M.

In order to elevate the magazines in the housing, a motor 51 is mounted in the housing, as shown in Figs. 3 and 8, and has a worm wheel 52 which engages a worm gear 53 secured to the upper end of the feed screw 47, as shown in Fig. 6. Completing an electric circuit to the motor 51 will cause the worm wheel 53 and feed screw 47 to be rotated in a clockwise direction with reference to Fig. 8 thereby permitting the support member 35, table 36, and magazines M to be raised in the housing under pressure of the coil spring 28.

In accordance with the present invention, operation of the motor 51 is stopped when the upper magazine of the stack of magazines supported on the table 36 reaches a predetermined vertical position in the housing 20. To accomplish this a pair of arms 55 and 56 are mounted on dividing plates 57 and 58 which extend lengthwise in the upper portion of the housing 20. The arms 55 and 56 are pivoted to the plates 57 and 58 adjacent the rear surface of the housing 20, as indicated at 61 and 62 respectively. A pair of flanges 63 and 64 extend inwardly from the arms 55 and 56, respectively, through openings 65 and 66 in the dividing plates 57 and 58, respectively. The flanges 63 and 64 are engaged by the upper magazine of the stack of magazines supported on the table 36, for example as indicated in Fig. 6 and the arms 55 and 56 are pivoted upwardly as the magazines are raised in the housing. A pair of normally closed micro-switches 67 and 68 are secured to the dividing plates 57 and 58, respectively, in engagement with the arms 55 and 56. When the arms 55 and 56 are raised to a predetermined position, the micro switches 67 and 68 are opened thereby breaking the circuit to the motor 51 and stopping rotation of the feed screw 47. The switches 67 and 68 are connected in series and opening either switch will stop operation of the motor 51. During normal operation of the machine, both of the switches 67 and 68 will be opened substantially simultaneously as the upper magazine of the stack of magazines will be substantially level or horizontal. By this construction, it is apparent that the upper magazine of the stack of magazines will always be at exactly the same level in the dispensing machine regardless of the number of magazines in the housing.

After the magazines reach their proper vertical position in the housing, the dispensing machine is ready to dispense a magazine therefrom when sufficient change is inserted into the coin slot 21. Upon deposit of sufficient change into the coin slot, the money will drop into the coin changer 22 and thence through a chute 71 to the coin box 24 where it will engage and momentarily close a normal open switch 72 which is positioned centrally of the chute 71, as illustrated in Fig. 3. Closing the switch 72 will actuate the magazine dispensing mechanism and cause the upper magazine to be ejected from the dispensing machine through a slot 73 into the forward face of the housing 20.

Figure 19:
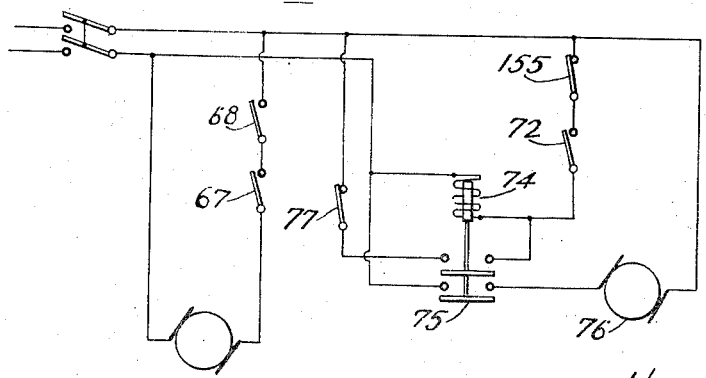
Fig. 19 is a schematic wiring diagram of the electric control system for the dispensing machine of the present invention.

With reference to Fig. 19, closing the switch 72 will complete an electric circuit to a solenoid 74 which in turn actuates a relay 75 and completes a circuit to a motor 76. At the same time the relay 75 closes, a holding circuit for the solenoid 74 is completed to maintain the solenoid energized after the switch 72 is opened. The motor 76 will continue to operate until a normal closed switch 77 which is formed as part of the holding circuit for the solenoid 74 is opened. Opening the switch 77 will break the holding circuit for the solenoid 74 and permit the relay 75 to be opened thereby disconnecting the circuit to the motor 76.

With reference to Fig. 6, the motor 76 is mounted on a bracket 81 extending transversely of the housing 20 and is interconnected with a shaft 82 so that actuation of the motor 76 will cause oscillating movement of the shaft 82 from a central position to an extreme counter-clockwise limit position, then to an extreme clockwise limit position and back to the central or neutral position again. In the illustrated embodiment of the present invention, this is accomplished by providing a gear reduction unit 83 on the motor 76 which causes the counter-clockwise rotation of a crank arm 84. The crank arm 84 in turn is connected to a connecting link 85 which is pinned or otherwise secured to the end of a rocker arm 86 carried by and rotatable with the shaft 82. By this construction one complete revolution of the crank arm 84 will cause the above described oscillating movement of the shaft 82. Operation of the motor 76 is stopped after one complete revolution of the crank arm 84 by means of the switch 77 which is engaged and momentarily opened by the crank arm 84 when the crank arm 84 reaches approximately the position shown in full lines in Fig. 6.

The initial counter-clockwise oscillating or rocking movement of the shaft 82 will cause similar rocking movement of a pair of arms 91 and 92 which are pinned or otherwise secured to the opposite ends of the shaft 82 as illustrated in Fig. 3. The downwardly extending arms 91 and 92 terminate in finger portions 93 and 94, respectively, which extend through slots in the pivoted arms 55 and 56 and engage a pair of ejection blades 95 and 96, respectively. The ejection blades 95 and 96 are formed as illustrated in Figs. 15 and 16 and extend forwardly from the finger portions of the arms 91 and 92 and terminate in relatively sharp pointed end portions 95a and 96a which may be moved to a position in engagement with the upper magazine, as shown in Figs. 13 and 14, to eject a magazine from the machine. The ejection blades 96 and 95 in turn are received in slots 55a and 56a which extend longitudinally in the pivoted arms 55 and 56 and are mounted for relatively sliding movement forwardly and rearwardly with respect to the housing 20. The initial counter-clockwise rocking movement of the shaft 82 and arms 91 and 92 will move the ejection blades 95 and 96 to an extreme rearward position in the housing 20. Clockwise movement of the shaft 82 will then force the ejection blade forwardly in the housing where the ejection blade will engage the top magazine in the stack of magazines, as more fully described hereinafter, and will force the magazine outwardly through the slot 73. Upon completion of the cycle of movement of the shaft 82, the ejection blades will be returned to a central position as shown in Fig. 8.

In accordance with the present invention guide means are provided to cause the ejection blades 95 and 96 to move toward a retracted position toward the side walls of the housing 20 during relative rearward movement in the housing 20 and to move toward an extended position inwardly of the housing into engagement with the magazine during their forward movement in the housing. In the illustrated embodiment of the present invention the guide means for directing the movement of the ejection blades 95 and 96 is shown in Figs. 8, 11, and 12 of the drawings and consists of a pair of rotatably mounted cam elements 97 and 98 which overlie a portion of the ejection blades 95 and 96 respectively and are resiliently urged to a position extending toward the center of the housing by means of coil springs 101 and 102, respectively, which interconnect pins 103 and 104 on the forward end of the cam elements 97 and 98 with lugs 105 and 106 carried by the pivoted arms 55 and 56, respectively. An upwardly extending cam follower 107 and 108 is provided on each of the ejection blades 95 and 96 and is in engagement with the peripheral edge surface of the cam elements 97 and 98 in order to guide the ejection blades during forward and rearward movement thereof.

The cam elements 97 and 98 in turn are positioned in a trackway 111 and 112 which are formed in block members 113 and 114 and carried by the pivoted arms 55 and 56. The coil springs 101 and 102 maintain the forward corner of the cam elements 97 and 98 in contact with the inner surface of the trackway 111 and 112 so that as the cam follower on the ejection blade is moved rearwardly with respect to the cam elements, it engages the forward face of the cam elements and forces the ejection blade outwardly toward the side edges of the dispensing machine, as shown in Fig. 8. Further rearward movement of the ejection blades 95 and 96 will cause the cam followers 107 and 108 to be withdrawn past the rear surface of the cam elements. During forward movement of the ejection blades 95 and 96, the cam followers 107 and 108 will engage the rear surface of the cam elements 97 and 98 and cause the ejection blades to be moved to a position extending inwardly of the housing 20 in engagement with the magazines, as illustrated in Figs. 11 and 12. Further forward movement of the ejection blades will force the upper magazine of the stack of magazines outwardly of the housing through the slot 73.

In addition, guide means are provided to control the relative vertical position of the ejection blades 95 and 96 after the ejection blades engage a magazine so that the magazine is directed through the slot 73. This is accomplished in the present invention by providing upwardly beveled forward edge portions 65a and 66a on the openings 65 and 66 in the dividing plates 57 and 58 respectively. The beveled forward edge portions of the openings 65 and 66 will be engaged by outwardly extending shoulder portions 95b and 96b of the ejection blades 95 and 96 if, for some reason, the ejection blades 95 and 96 are not in their proper vertical position in the dispensing machine and thereby direct the ejection blades and the magazine through the slot 73. Under normal operation of the machine, however, the magazines will be forced directly forward outwardly through the opening 73 and the ejection blades 95 and 96 will not engage the forward edge of the openings 65 and 66. By this construction the forward edge of the magazine is prevented from engaging any portion of the housing 20 of the dispensing machine, while it is being removed from the dispensing machine.

An important feature of the present invention is the provision of a plate 115 which is pivotally mounted transversely of the dispensing machine indicated as 116 in Figs. 6 and 7 and is adapted to be maintained in a position between the forward edge of the magazines and the slot 73 to prevent the theft of magazines from the dispensing machine. The plate 115 will be engaged by the forward edge of the magazine and pivoted upwardly about its pivot point 116 as a magazine is being ejected from the dispensing machine. However, during the normal rest position of the machine a latch member 117 engages the rear surface of the plate 115 and prevents the plate from being pivoted upwardly. Prior to engagement of the magazines by the ejection blades 95 and 96, the latch member 117 and a bracket 118 which mounts the latch member 117, is pulled rearwardly out of engagement from the plate 115 by a connecting link 121 which interconnects the bracket 118 with an eccentric 122 which is rotatable with the crank arm 84. This construction prevents the theft of magazines from the dispensing machine yet readily permits a magazine to be ejected from the machine during proper operation of the dispensing machine.

After a magazine has been removed from the dispensing machine, the pivoted arms 55 and 56 pivot downwardly about their pivot points until the inwardly extending flanges 63 and 64, formed as integral parts of arms 55 and 56, rest against the top magazine of the stack of magazines in the machine. The downward pivotal movement of the arms 55 and 56, will permit the microswitches 67 and 68 to be closed thereby completing an electric circuit to the motor 51. The motor will then operate and cause rotation of the feed screw 47 as previously described thereby raising the table 36 which supports the magazines. The motor 51 will continue to operate until the arms 55 and 56 reach relative vertical position which opens the switches 67 and 68. By this construction the upper magazine in the stack of magazines will always be at exactly the same vertical position in the dispensing machine regardless of the number of magazines in the machine. In addition, a pair of coil springs 123 and 124 may be provided which interconnects the pivoted arms 55 and 56 with the dividing plates 57 and 58, respectively, to support a portion of the weight of the pivoted arms 55 and 56 and prevent the entire weight of the arms from resting on top of the stack of magazines.

In accordance with the present invention when the dispensing machine is being loaded, one magazine is positioned in the upper portion of the housing immediately beneath the window 26 to display the magazine being dispensed by the machine. In addition, the magazine placed beneath the window 26 is the last magazine to be dispensed from the machine and thus, when there is no magazine visible in the window 26, the prospective customer will know the machine is empty. As shown in Figs. 4, 7, and 9, the last magazine positioned in the machine is carried by a tray 130 which is normally positioned in spaced parallel relationship with the window 26 and may be pivoted downwardly so that the lower end thereof is in registry with the slot or opening 73 in the housing 20, as more fully described hereinafter.

A pair of brackets 131 and 132 mounted on a support member 133 extending transversely on the machine engage lugs 134 and 135, respectively, which extend outwardly from the rear portion of the side edges of the tray 130. If desired one or both of the brackets 131 and 132 may be mounted for relative pivotal movement outwardly away from the side edges of the tray 130 as illustrated in Fig. 9 to permit the tray to be readily secured in position in the upper portion of the housing. The lower portion of the tray is normally supported in an elevated position out of registry with the slot 73 by means of a pair of movable pins 136 and 137 mounted at right angles to the tray 130 for relative vertical movement with respect to the tray. The pins 136 and 137 are mounted for sliding movement in a pair of U-shaped brackets 138 and 139, respectively, secured to the inner side wall of the dividing plates 57 and 58 and have extreme lower end portions 136a and 137a which extend outwardly through slots in the dividing plates into engagement with a pair of pivoted latches 141 and 142, respectively. The latches are normally maintained in a forward limit position in engagement with the pins 136 and 137 to maintain the pins in an elevated position in engagement with the tray 130. A support member 143 extending downwardly from the upper surface of the housing and having finger portions 144 projecting through slots or openings 145 in the upper surface of the tray 130, as illustrated in Fig. 9, engages the magazine carried by the tray and holds the magazine beneath the window 126.

An important feature of the present invention is the provision of latch release mechanism which disengages the latches 141 and 142 from the pins 136 and 137 and permits the pins 136 and 137 to drop thereby lowering the forward end of the tray and discharging the magazine therefrom. This latch release mechanism should only be actuated after the stack of magazines carried by the table 36 is completely depleted so that inserting change into the dispensing machine will cause the shaft 82 and arms 91 and 92 to actuate the latch release mechanism and permit the magazine in the window to be dispensed from the machine. In the illustrated embodiment of the present invention this is accomplished by providing a pair of vertical pins 146 and 147 mounted for relative vertical movement inwardly of the dividing plates 57 and 58, for example as illustrated in Fig. 3. The lower ends of the pins 146 and 147 normally bear against the upper magazine in the stack of magazines and are disposed in registry with slots 148 and 149, respectively, in the upper surface of the table 36. On the other hand, the upper ends of the pins 146 and 147 project outwardly through elongated vertical slots 151 and 152 in the dividing plates 57 and 58 and engage actuating levers 153 and 154, respectively, and maintain the actuating levers in an elevated position.

When the supply of magazines on the table 36 is depleted, the pins 146 and 147 will drop downwardly through the slots 148 and 149 thereby lowering the actuating levers 153 and 154 to the position illustrated in Fig. 5 wherein the actuating levers 153 and 154 engage the latch members 141 and 142 respectively. The extreme rearward ends of the actuating levers 153 and 154 are provided with elongated longitudinal slots which engage pins extending inwardly from the oscillating arms 91 and 92 so that during forward movement of the arms 91 and 92 from the central position shown in Fig. 4 the actuating levers 153 and 154 will not be moved. However, when the arms 91 and 92 are moved toward their extreme rearward position the pins carried by the arms will engage the ends of the longitudinal slots in the actuating levers and pull the actuating levers rearwardly with respect to the dispensing machine. During the rearward movement of the actuating levers 153 and 154, they will engage the latches 141 and 142 and pivot the latches in a clockwise direction with respect to Fig. 4 to the position illustrated in Fig. 5 thereby disengaging the latches 141 and 142 from the pins 136 and 137.

With reference to Fig. 5, disengagement of the pins 136 and 137 from the latches 141 and 142 will permit the pins to drop downwardly with respect to the tray 130 thereby causing the tray to drop to the position shown in full lines in Fig. 5. This downward movement of the tray 130 will disengage the fingers 144 from the magazine carried by the tray and permit the magazine to slide downwardly along the length of the tray and be removed from the dispensing machine through the slot 73. When the latches 141 and 142 reach their extreme rearward limit position, a normally closed microswitch 155 is engaged by the latch 141 and is opened thereby breaking the circuit to the solenoid 74 and stopping operation of the motor 76. By this construction, it will be observed that after the stack of magazines on the table 36 is depleted, the next user of the vending machine will receive the magazine which is supported beneath the window 26 and the machine will then stop operating and give a visual indication that the machine is empty.

In order to reload the dispensing machine of the present invention, the upper portion of the housing 21 is pivoted about the pivot point 25 and to the position shown in broken lines in Fig. 2. The table 36 is then pushed downwardly in the housing against the pressure of the coil spring 28 and the pivoted finger member 48 which engages the feed screw 47 maintains the table 36 in this lowered position in the housing.

The magazines are then placed on the table 36 with their bound ends extending toward the forward end of the machine so that the magazines will be engaged and ejected from the machine by the ejection blades 95 and 96. After a complete stack of magazines is positioned on the table 36 a magazine is inserted into the tray 130 and the actuating levers 153 and 154 are disengaged from the latch members 141 and 142 permitting the latch members 141 and 142 to be moved to their extreme forward limit position where they engage and maintain the pins 136 and 137 in contact with the tray 130. The upper portion of the housing is then locked in its closed position and the machine is ready for use. If desired, a pair of electric light bulbs for example, fluorescent lamps, may be positioned along the side edges of the window 26 as shown in Figs. 4, 6, and 10 to illuminate the magazine which is positioned beneath the window 26.

After the upper portion of the housing is locked in its lowered position, the motor 51 which rotates the feed screw 47 is operated to elevate the magazines carried by the table 36 in the housing. The motor 51 continues to operate until the upper magazine in the stack of magazines engages the pivoted arms 55 and 56 as previously described and closes the micro switches 67 and 68. The dispensing machine is then ready to dispense magazines and inserting change into the machine will start one cycle of operation of the motor 76 thereby forcing the ejection blades 95 and 96 inwardly of the machine into engagement with the upper magazines of the stack of magazines and ejecting the magazine from the machine. After the entire stack of magazines is dispensed from the machine the actuating levers 153 and 154 are permitted to engage the latches 141 and 142 and inserting change into the dispensing machine will now cause the latches 141 and 142 to be moved rearwardly to dispense the magazine placed beneath the window 26 from the machine.

From the foregoing, it will be observed that the present invention provides a novel dispensing machine which contains a plurality of magazines and will dispense the magazines from the machine one at a time when change is inserted into the machine. In addition, it will be observed that the present invention provides a novel dispensing machine which is operable to give visual indication to a prospective user of the machine that the machine is empty and will thereby prevent the user from inserting change into the machine when the machine is empty.

Where a particular embodiment of the present invention has been illustrated and described herein, it is not intended to limit the invention to such a disclosure and changes and modifications may be incorporated and embodied therein within the scope of the following claims.

I claim:

1. In a machine for dispensing magazines, newspapers, and like articles, a support for a stack of articles mounted for vertical movement in the machine, a coil spring positioned beneath said support to support said support and said stack, release mechanism connected to said support including an electric motor operable to cause elevation of the support and stack of articles in the dispensing machine, an arm mounted in the dispensing machine for relative movement between upper and lower limit positions and operable to be raised to its upper limit position during upward movement of the stack of articles, and electric switch means cooperatively associated with said arm actuatable upon movement of said arm to its upper limit position to stop operation of said electric motor and thereby prevent further upward travel of the stack of articles in the dispensing machine.

2. In a machine for dispensing magazines, newspapers, and like articles, a support for a stack of articles mounted for vertical movement in the machine, means normally urging said support and stack of articles upwardly, a vertical feed screw mounted adjacent said support, means including a pivoted finger carried by said support in engagement with said feed screw to interconnect said support with said feed screw, drive means including an electric motor associated with said feed screw operable to rotate said feed screw and cause elevation of the support and stack of articles in the dispensing machine, an arm mounted in the dispensing machine for relative movement between upper and lower limit positions and operable to be raised to its upper limit position during upward movement of the stack of articles, and electric switch means cooperatively associated with said arm actuatable upon movement of said arm to its upper limit position to stop operation of said electric motor and thereby prevent further upward travel of the stack of articles in the dispensing machine.

3. In a machine for dispensing magazines, newspapers, and like articles, a support for a stack of articles mounted for vertical movement in the machine, a coil spring positioned beneath said support member to carry said support and said articles, a vertical feed screw mounted adjacent said support, means including a pivoted finger carried by said support in engagement with said feed screw to interconnect said support with said feed screw, drive means including an electric motor associated with said feed screw operable to rotate said feed screw and cause elevation of the support member and stack of articles in the dispensing machine, an arm pivotally mounted in the dispensing machine for relative movement between upper and lower limit positions and operable to be raised to its upper limit position during upward movement of the stack of articles, and electric switch means cooperatively associated with said arm actuatable upon movement of said arm to its upper limit position to stop operation of said electric motor and thereby prevent further upward travel of the stack of articles in the dispensing machine.

4. In a machine for dispensing magazines, newspapers, and like articles comprising a casing, means defining a dispensing slot in said casing, a support for a stack of articles mounted for vertical movement in the machine operable to position the upper article of said stack of articles adjacent said dispensing slot, a pair of ejection blades outwardly adjacent opposite edges of the upper article of the stack mounted for relative horizontal movement between forward and rearward limit positions, cam means mounted adjacent each of said ejection blades in engagement therewith to direct movement of said ejection blades, said ejection blades actuatable inwardly during movement toward their forward limit position to engage the upper article of the stack and force the same out of the machine through said dispensing slot and actuatable to a retracted position out of engagement with the articles during movement to their rearward limit position, and drive means including an electric motor operable to actuate said ejection blades.

5. In a dispensing machine for magazines and like articles comprising a housing having a slot therein through which articles are dispensed, means in said housing to support a stack of articles with the articles disposed in a horizontal position, a pair of ejection blades at opposite sides of said housing outwardly adjacent the edges of the upper article of the stack mounted for relative horizontal movement between forward and rearward limit positions toward and away from said slot, cam means mounted adjacent each of said ejection blades in engagement therewith to direct movement of said ejection blades, said ejection blades actuatable inwardly during movement toward their forward limit position to engage the upper article of the stack and force the same out of the housing through said slot and actuatable to a retracted position out of engagement with the articles during movement to their rearward limit position, and drive means including an electric motor operable to actuate said ejection blades.

6. Apparatus in accordance with claim 5 wherein guide means are provided in engagement with said ejection blades operable to guide said ejection blades during forward movement thereof to a vertical position in registry with said slot and direct the ejection blades outwardly through the slot.

7. In a dispensing machine for magazines and like articles comprising a housing having a slot therein through which articles are dispensed, means in said housing to support a stack of articles with the articles disposed in a horizontal position with the upper article of said stack substantially in registry with said slot, a pair of ejection blades at opposite sides of said housing outwardly adjacent the edges of the upper article of the stack of articles mounted for relative horizontal movement between forward and rearward limit positions toward and away from said slot, a cam follower carried by each of said ejection blades, a cam track mounted adjacent each of said ejection blades in engagement with said cam followers operable to direct movement of said ejection blades, said ejection blades actuatable inwardly during movement toward their forward limit position to engage the upper article of the stack and force the same out of the housing through said slot and actuatable to a retracted position out of engagement with the articles during movement to their rearward limit position, and drive means including an electric motor operable to actuate said ejection blades.

8. In a dispensing machine for magazines and like articles comprising a housing having a slot therein through which articles are dispensed, means in said housing to support a stack of articles with the articles disposed in a horizontal position, a pair of ejection blades at opposite sides of said housing outwardly adjacent the edges of the upper article of the stack mounted for relative horizontal movement between forward and rearward limit positions toward and away from said slot, cam means mounted adjacent each of said ejection blades in engagement therewith operable to direct movement of said ejection blades, said ejection blades actuatable inwardly during movement toward their forward limit position to engage the upper article of the stack and force the same out of the housing through said slot and actuatable to a retracted position out of engagement with the articles during movement to their rearward limit position, drive means including an electric motor operable to actuate said ejection blades, and control mechanism including an electric switch to selectively actuate said drive means and cause an article to be dispensed from the housing.

9. In a dispensing machine for magazines and like articles comprising a housing having a slot therein through which articles are dispensed, means in said housing to support a stack of articles with the articles disposed in a horizontal position, a pair of ejection blades at opposite sides of said housing outwardly adjacent the edges of the upper article of the stack mounted for relative horizontal movement between forward and rearward limit positions toward and away from said slot, cam means mounted adjacent each of said ejection blades in engagement therewith to direct movement of said ejection blades, said ejection blades actuatable inwardly during movement toward their forward limit position to engage the upper article of the stack and force the same out of the housing through said slot and actuatable to a retracted position out of engagement with the articles during movement to their rearward limit position, drive means including an electric motor operable to actuate said ejection blades, a plate pivotally mounted inwardly adjacent said slot, latch means in engagement with said plate operable to maintain said plate inwardly adjacent said slot to prevent removal of articles from the housing, and latch release mechanism actuatable by said drive means to disengage said latch means from said plate and thereby permit an article to be dispensed through the slot.

10. In a dispensing machine for magazines and like articles comprising a housing having a slot therein through which articles are dispensed, means in said housing to support a stack of articles with the articles disposed in a horizontal position, a pair of ejection blades at opposite sides of said housing outwardly adjacent the edges of the upper article of the stack mounted for relative horizontal movement between forward and rearward limit positions toward and away from said slot, cam means mounted adjacent each of said ejection blades in engagement therewith to direct movement of said ejection blades, said ejection blades actuatable inwardly during movement toward their forward limit position to engage the upper article of the stack and force the same out of the housing through said slot and actuatable to a retracted position out of engagement with the articles during movement to their rearward limit position, drive means including an electric motor operable to actuate said ejection blades, control mechanism including an electric switch to selectively actuate said drive means and cause an article to be dispensed from the housing, a plate pivotally mounted inwardly adjacent said slot, latch means in engagement with said plate operable to maintain said plate inwardly adjacent said slot to prevent removal of articles from the housing, and latch release mechanism actuatable by said drive means to disengage said latch means from said plate and thereby permit an article to be dispensed through the slot.

11. In a dispensing machine for magazines and like articles comprising a housing having a horizontal slot therein through which articles are dispensed, means in said housing to support a stack of articles with the articles disposed in a horizontal position with the upper article of said stack substantially in registry with said slot, a pair of ejection blades at opposite sides of said housing outwardly adjacent the edges of the upper article of the stack mounted for relative horizontal movement between forward and rearward limit positions toward and away from said slot, a cam follower carried by each of said ejection blades, a cam track mounted adjacent each of said ejection blades in engagement with said cam followers operable to direct movement of said ejection blades, said ejection blades actuatable inwardly during movement toward their forward limit position to engage the upper article of the stack and force the same out of the housing through said slot and actuatable to a retracted position out of engagement with the articles during movement to their rearward limit position, drive means including an electric motor operable to actuate said ejection blades, control mechanism including an electric switch to selectively actuate said drive means and cause an article to be dispensed from the housing, a plate pivotally mounted inwardly adjacent said slot, latch means in engagement with said plate operable to maintain said plate inwardly adjacent said slot to prevent removal of articles from the housing, and latch release mechanism actuatable by said drive means to disengage said latch means from said plate and thereby permit an article to be dispensed through the slot.

12. In a dispensing machine for magazines and like articles comprising a housing having a horizontal slot therein through which articles are dispensed, a vertically movable support in said housing operable to support a stack of articles, dispensing means including a pair of ejection blades mounted at opposite sides of the housing for forward and rearward movement, ejection drive mechanism cooperatively associated with said ejection blades operable to actuate said blades inwardly into engagement with the upper article of said stack and forwardly to dispense an article from said housing, a tray mounted adjacent the top of the housing for movement between upper and lower limit positions operable to carry one article, latch mechanism in engagement with said tray to maintain the tray in its upper limit position, latch release mechanism in engagement with the stack of articles operable after the last article of the stack has been dispensed from the housing to engage said latch mechanism, and means interconnecting said latch release mechanism and said ejection drive mechanism operable after the last article of the stack has been dispensed from the housing to actuate said latch release mechanism upon actuation of said ejection drive mechanism and cause said latch release mechanism to disengage said latch mechanism from said tray and permit the article thereon to be dispensed from said machine.

13. In a dispensing machine for magazines and like articles comprising a housing having a slot therein through which articles are dispensed, a vertically movable support in said housing operable to support a stack of articles, means to raise said support member in said housing and maintain the upper article of said stack in registry with said slot, dispensing means including a pair of ejection blades mounted at opposite sides of the housing for forward and rearward movement, ejection drive mechanism cooperatively associated with said ejection blades operable to actuate said blades inwardly into engagement with the upper article of said stack and forwardly to dispense an article from said housing, a tray mounted adjacent the top of the housing for movement between upper and lower limit positions operable to carry one article, latch mechanism in engagement with said tray to maintain the tray in its upper limit position, latch release mechanism in engagement with the stack of articles operable after the last article of the stack has been dispensed from the housing to engage said latch mechanism, and means interconnecting said latch release mechanism and said ejection drive mechanism operable after the last article of the stack has been dispensed from the housing to actuate said latch release mechanism upon actuation of said ejection drive mechanism and cause said latch release mechanism to disengage said latch mechanism from said tray and permit the article thereon to be dispensed from said machine.

14. In a dispensing machine for magazines and like articles comprising a housing having a horizontal slot therein through which articles are dispensed, a vertically movable support member in said housing operable to support a stack of articles, means normally urging said support member upwardly in said housing, release mechanism for said means engageable by the upper article of said stack and operable to release said means to permit elevation of the stack of articles and maintain the upper article of said stack in registry with said slot, dispensing means including a pair of ejection blades mounted at opposite sides of the housing for forward and rearward movement, ejection drive mechanism cooperatively associated with said ejection blades operable to actuate said blades inwardly into engagement with the upper article of said stack and forwardly to dispense an article from said housing, a tray pivotally mounted adjacent the top of the housing for pivotal movement between upper and lower limit positions operable to carry one article, latch mechanism in engagement with said tray to maintain the tray in its upper limit position, latch release mechanism in engagement with the stack of articles operable after the last article of the stack has been dispensed from the housing to engage said latch mechanism, and means interconnecting said latch release mechanism and said ejection drive mechanism operable after the last article of the stack has been dispensed from the housing to actuate said latch release mechanism upon actuation of said ejection drive mechanism and cause said latch release mechanism to disengage said latch mechanism from said tray and permit the article thereon to be dispensed from said machine.

15. In a dispensing machine for magazines and like articles comprising a housing having a horizontal slot therein through which articles are dispensed, a support member mounted for relative vertical movement operable to carry a stack of articles, a coil spring positioned beneath said support member to support said support member and said articles, a vertical feed screw mounted adjacent said support member, means including a pivoted finger carried by said support member in engagement with said feed screw to interconnect said support member with said feed screw, drive means including an electric motor associated with said feed screw operable to rotate said feed screw and cause elevation of the support member and stack of articles in the dispensing machine, an arm pivotally mounted in the dispensing machine for relative movement between upper and lower limit positions and operable to be raised to its upper limit position during upward movement of the stack of articles, electric switch means cooperatively associated with said arm actuatable upon movement of said arm to its upper limit position to stop operation of said electric motor and thereby prevent further upward travel of the stack of articles in the dispensing machine, a pair of ejection blades at opposite sides of said housing outwardly adjacent the edges of the upper article of the stack and mounted for relative horizontal movement between forward and rearward limit positions toward and away from said slot, a cam follower carried by each of said ejection blades, a cam track mounted adjacent each of said ejection blades in engagement with said cam followers operable to direct movement of the ejection blades during movement of the ejection blades toward their forward and rearward limit positions, said blades actuatable inwardly by said cam followers during movement toward their forward limit position into engagement with the upper article of the stack to force the same out of the housing through said slot and actuatable by said cam followers during rearward movement to a retracted position out of engagement with the articles, second drive means including an electric motor operable to actuate said ejection blades, control mechanism including an electric switch to selectively actuate said drive means and cause an article to be dispensed from the housing, a plate pivotally mounted inwardly adjacent said slot, latch means in engagement with said plate operable to maintain said plate in position adjacent said slot to prevent removal of articles from the housing, latch release mechanism actuatable by said second drive means to permit displacement of said pivoted plate and thereby permit an article to be dispensed through the slot.

16. In a dispensing machine for magazines and like articles comprising a housing having a horizontal slot therein through which articles are dispensed, a support member mounted for relative vertical movement operable to carry a stack of articles, a coil spring positioned beneath said support member to support said support member and said articles, a vertical feed screw mounted adjacent said support member, means including a pivoted finger carried by said support member in engagement with said feed screw to interconnect said support member with said feed screw, drive means including an electric motor associated with said feed screw operable to rotate said feed screw and cause elevation of the support member and stack of articles in the dispensing machine, an arm pivotally mounted in the dispensing machine for relative movement between upper and lower limit positions and operable to be raised to its upper limit position during upward movement of the stack of articles, electric switch means cooperatively associated with said arm actuatable upon movement of said arm to its upper limit position to stop operation of said electric motor and thereby prevent further upward travel of the stack of articles in the dispensing machine, a pair of ejection blades at opposite sides of said housing outwardly adjacent the edges of the upper article of the stack and mounted for relative horizontal movement between forward and rearward limit positions toward and away from said slot, a cam follower carried by each of said ejection blades, a cam track mounted adjacent each of said ejection blades in engagement with said cam followers operable to direct movement of the ejection blades during movement of the ejection blades toward their forward and rearward limit positions, said blades actuatable inwardly by said cam followers during movement toward their forward limit position into engagement with the upper article of the stack to force the same out of the housing through said slot and actuatable during rearward movement by said cam followers to a retracted position out of engagement with the articles, second drive means including an electric motor operable to actuate said ejection blades, control mechanism including an electric switch to selectively actuate said second drive means and cause an article to be dispensed from the housing, a plate pivotally mounted inwardly adjacent said slot, latch means in engagement with said plate operable to maintain said plate in position adjacent said slot to prevent removal of articles from the housing, latch release mechanism actuatable by said second drive means to permit displacement of said pivoted plate and thereby permit an article to be dispensed through the slot, a tray mounted adjacent the upper surface of the dispensing machine to carry one article, latch mechanism mounted in said housing in engagement with said tray operable to maintain said tray in an elevated position and prevent displacement of the article from the tray, latch release mechanism in engagement with the stack of articles operable after the last article of the stack has been dispensed from the housing to engage said latch mechanism, and means interconnecting said latch release mechanism and said second drive means operable after engagement of said latch mechanism by said latch release mechanism to actuate said latch release mechanism and cause the same to disengage the latch mechanism from said tray and permit the article thereon to be dispensed from said machine.

References Cited in the file of this patent
UNITED STATES PATENTS

| | | |
|---|---|---|
| 494,444 | Salter et al. | Mar. 28, 1893 |
| 749,535 | Dawes | Jan. 12, 1904 |
| 952,536 | Lovatt | Mar. 22, 1910 |
| 1,072,947 | Hotaling | Sept. 9, 1913 |

(Other references on following page)

UNITED STATES PATENTS

| | | | |
|---|---|---|---|
| 1,229,054 | Fife et al. | June 5, | 1917 |
| 1,256,071 | Steiner | Feb. 12, | 1918 |
| 1,509,249 | Miles et al. | Sept. 23, | 1924 |
| 1,512,122 | Marcel | Oct. 21, | 1924 |
| 1,563,991 | Hunt | Dec. 1, | 1925 |
| 1,622,262 | Kindrat et al. | Mar. 22, | 1927 |
| 1,655,325 | Mitchusson et al. | Jan. 3, | 1928 |
| 1,997,079 | Reimers et al. | Apr. 9, | 1935 |
| 2,006,100 | Hight et al. | June 25, | 1935 |
| 2,198,168 | Harris | Apr. 23, | 1940 |
| 2,289,807 | Schaevitz et al. | July 14, | 1942 |
| 2,501,434 | Cameron | Mar. 21, | 1950 |
| 2,522,033 | Graham | Sept. 12, | 1950 |
| 2,525,682 | Kaplan | Oct. 10, | 1950 |
| 2,538,238 | Evans | Jan. 16, | 1951 |
| 2,546,352 | Weaver | Mar. 27, | 1951 |
| 2,594,147 | Fry | Apr. 22, | 1952 |
| 2,621,994 | Sadler | Dec. 16, | 1952 |

FOREIGN PATENTS

| | | | |
|---|---|---|---|
| 61,193 | Denmark | July 19, | 1943 |